Figure 4:
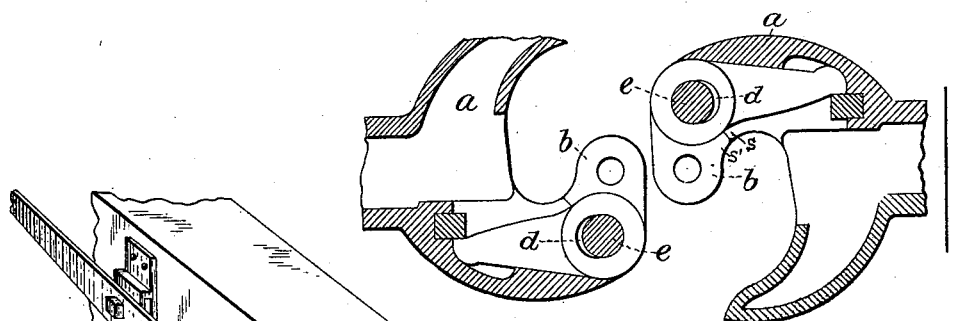

(No Model.) 2 Sheets—Sheet 1.

O. E. MICHAELIS.
CAR COUPLING.

No. 404,296. Patented May 28, 1889.

Attest.
Geo. T. Smallwood.
Jas. K. McCathran.

Inventor
Otto E. Michaelis (No Model.)
2 Sheets—Sheet 2.
O. E. MICHAELIS.
CAR COUPLING.
No. 404,296. Patented May 28, 1889.
FIG_5_
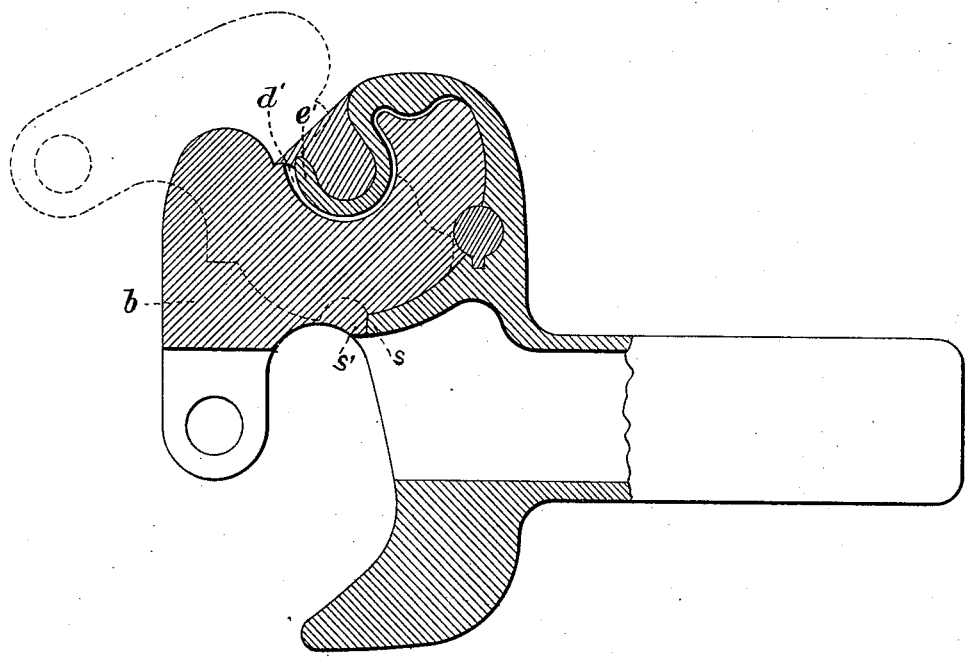
Attest.
Geo. T. Smallwood
Jas. K. McLathran
Inventor
Otho E. Michaelis

UNITED STATES PATENT OFFICE.

OTHO E. MICHAELIS, OF THE UNITED STATES ARMY, ASSIGNOR, BY MESNE ASSIGNMENTS, TO THE CONSOLIDATED COUPLING COMPANY, OF NEW YORK, N. Y.

CAR-COUPLING.

SPECIFICATION forming part of Letters Patent No. 404,296, dated May 28, 1889.

Application filed April 20, 1888. Serial No. 271,288. (No model.)

*To all whom it may concern:*

Be it known that I, OTHO E. MICHAELIS, captain of ordnance, United States Army, at present stationed at Augusta, Maine, have invented certain new and useful Improvements in Car-Couplings, of which the following is a specification.

Vertical-hook couplers, by recent strong expression of practical railroad-car-construction opinion, have at once become, so to speak, the standard means for coupling freight-cars. Such couplers have for years been successfully used in the passenger service; but there they serve but a single purpose—viz., as mere connecting devices—and they are relieved from impact stress by buffing platforms or attachments. In the freight service, unless the coupler be supplemented by expensive buffing devices, it must serve both as connection and buffer.

In the vicissitudes of service cars having vertical-hook couplers will come together with the hook or knuckle of the coupling member of each car closed, so that said hooks sustain the shock attending the meeting of the cars. Again, a car having a vertical-hook coupling member may meet a car having the usual draw-bar, like the Safford or the Potter, and if the hook be closed it will sustain the shock of the impact. This proves the almost self-evident conclusion that until absolute unity and uniformity of equipment and construction be secured the freight-car coupler must also be a buffer.

Tests made by me have demonstrated that no vertical-hook coupler can successfully meet the requirements of the freight service unless it fulfills the following conditions:

First. There must be no sheering or bending stress upon the axial or supporting pin or device on which the hook swings. When such stresses obtain, the resulting strains are transverse, and from their very construction these pins or devices are easily "set" or broken when subjected to transverse strains exceeding their small elastic limit in this direction. Hence the influence of the original stress under repetition is cumulative, and the tendency to bend, sheer, or break increases with every impact until the hook either no longer works freely or comes to rest upon portions of the head not originally adapted to sustain it, and under further impact shocks the pin or other device no longer contributes aid, and the hook, if strong enough, punches out the head.

Second. The hook or knuckle, as a necessary element of the coupler as a buffer, must under impact—preferably before impact—so seat itself upon the draw-head as to become virtually an integral portion of it and call into play the maximum compressive resistance of the whole draw-head. If the hook be made sufficiently strong, regardless of its attachments, it will under continuing impact shocks break the head. If the head be made heavy enough, the hook will become disabled.

The necessity of the conditions I have formulated is further shown by the consideration of a well-understood property of matter. The inertia of the whole draw-head must be overcome before relief from the draw-bar coil-spring is "felt." In the vertical-hook coupler the hook, of small weight compared with the entire draw-bar attachment, is interposed between it and the impinging body. Hence the hook must sustain the entire shock until the inertia of the draw-head is overcome. A deft blacksmith can fashion iron on an anvil supported upon a man's chest without pain to the human bed or injury to the block. Upon this subject the highest practical authority in the United States speaks as follows:

"It is daily becoming more apparent that we cannot consistently expect the small detail parts of a coupler (a vertical-hook coupler is meant) to act as a buffer between such ponderous bodies as heavily-loaded freight-cars brought into sudden conjunction. Though these are designed to operate together in forming a coupling, they cannot successfully perform this function in a satisfactory manner and be the first to receive the whole force of the blows of service."—*Executive Committee, Master Car-Builders.*

The object of my invention is to permit the vertical hook to be used in the freight service without the immediate adoption of expensive buffing arrangements by so modifying its attachment, support, and housing that it will successfully resist the strains due to the "sudden conjunction" of "such ponderous bodies as heavily-loaded freight-cars." I do this by abolishing concentric closely-fitting rotating surfaces between the hook and its axis of rotation and substituting bearing-surfaces which are eccentric or elongated in the direction of the strains. Thus, where an axial pin is used, I make the pin-hole approximately elliptical, thus allowing the knuckle to seat itself, as will be described immediately, without strain on the pin; or, where an open rotating bearing in the knuckle operates upon a corresponding cylindrical buttress in the head, I make the two bearing-surfaces of revolution eccentric again to permit the seating of the knuckle on surfaces of the draw-head independent of the buttress.

I provide for each special type of vertical-hook coupler suitable bearing-surfaces on the hook and corresponding bearing-surfaces on the draw-head, which engage to resist the force of impact when cars are brought together having different forms of couplers or where the hooks are not properly set, thus relieving the pivot of the hook of all strain, the bearing for the same being somewhat loose, the said bearing-surfaces being so disposed as to take up the shock whether brought to bear on the end of the hook or at a point in line with the pivot, as will now appear.

Figure 1:
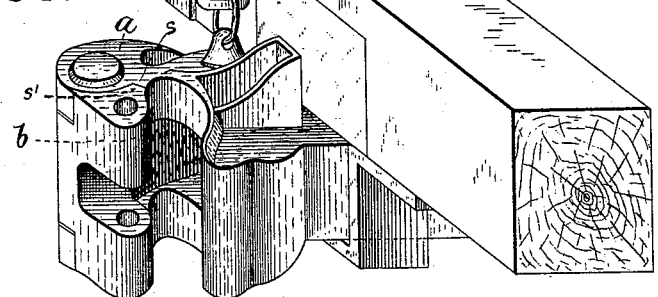
Figure 2:
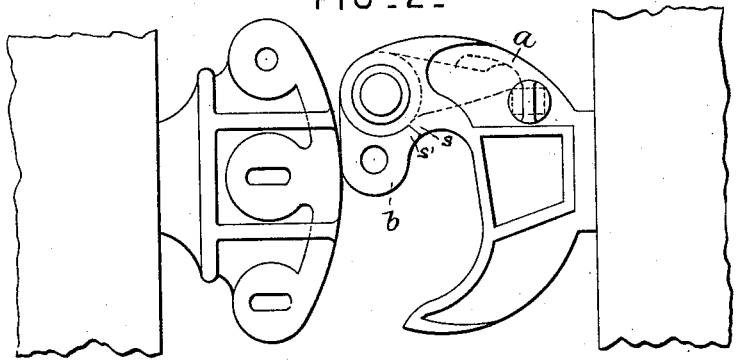
Figure 3:
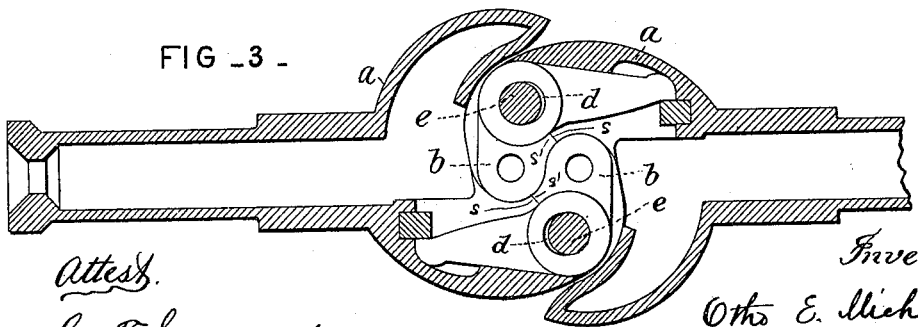

Of the accompanying drawings, forming a part of this specification, Figure 1 represents a perspective view of a coupling member of the Janney type having a vertical hook. Fig. 2 represents a top view of two contacting coupling members, one being of the vertical-hook type and the other a draw-head for use with a link and pin. Fig. 3 represents a horizontal section, showing two vertical-hook coupling members coupled together, the hooks or knuckles having elongated orifices containing the axial pins on which the hooks swing. Fig. 4 represents a similar section, showing the members as having collided with the hooks or knuckles closed and locked. Fig. 5 represents a sectional view of a coupling member having an open rotating bearing in the hook or knuckle operating upon a cylindrical buttress in the head, said bearing being eccentric to the bearing-surface of the buttress.

The same letters of reference indicate the same parts in all the figures.

In the drawings, $a$ represents the draw-head, and $b$ the hook or knuckle, of a vertical-hook coupler. In Figs. 1, 2, 3, and 4 the hook is shown with an orifice, $d$, to receive an axial pin, $e$, attached to the draw-head, as in the Janney coupler, while in Fig. 5 the hook is shown with an open bearing, $d'$, formed to turn upon a corresponding cylindrical buttress, $e'$, within the draw-head, as in the Dowling coupler.

In carrying out my invention I so construct the hook with reference to the fixed axis on which it swings that it will fit loosely on said axis, so that the hook will have sufficient lateral play to enable it to move relatively to its axis and come to a full and extended bearing on the draw-head when an opposing coupling member strikes said hook without having any injurious bearing upon or contact with its axis. To this end, in the type of coupler shown in Figs. 1, 2, 3, and 4, I make the orifice $d$ larger than the axial pin which it receives, (said orifice being preferably approximately elliptical, as shown,) and I arrange said orifice so that the entire pressure exerted on the hook by the opposing coupling member will be supported by the reciprocal bearing-surfaces on the draw-head and hook, and not by the axial pin $e$, the latter serving only as a means for operatively connecting the draw-head and its hook and preventing the removal of the latter from the draw-head. The pin is therefore protected, so that there is no injury to the coupler by the cumulative effect of shocks and blows to which the hook is subjected unless such shocks and blows are sufficiently violent to fracture the hook or draw-head.

In the coupler shown in Fig. 5 I carry out my invention by making the open bearing $d'$ eccentric to the fixed buttress $e'$, on which it turns, and relatively arranging said bearing and buttress in the same manner that the pin $e$ and orifice $d$ are relatively arranged, so that the hook will not come to a bearing on the buttress when brought in contact with an opposing coupling member, but will be supported by portions of the draw-head better adapted to resist the strain imposed by the contact of two opposing coupling members— i. e., the shoulders $s\,s'$ and the extended bearing at the back of the hook.

To insure economy in the construction of couplers, the amount of finishing required for the castings of which they are composed must be reduced to the minimum. It is impossible to cast the reciprocal bearing-surfaces of the hook or knuckle and draw-head so that they will fit perfectly when the hook has no lateral play on its pivot or fulcrum. It will be seen, however, that by the freedom of lateral movement provided by my improvement the bearing-surfaces of the hook are enabled to adjust themselves to those of the draw-head.

It is obvious that the form of the surfaces of the draw-head which actually support the hook under the strain above referred to, and of the corresponding surfaces of the hook, may be variously modified. Said surfaces should be formed and arranged to (as nearly as possible) support all parts of the hook against the backward pressure or strain exerted upon it, whether brought to bear upon the heavy portion of the hook in line with the pivot or on the point, the resistance of the strain brought to bear on the latter being particularly the office of the shoulders $s\,s'$.

The shoulders or abutments $s\,s'$, it will be seen, to accomplish the result, must meet to prevent the rotation of the hook around its axis and be located between the point of the hook and its axial point, as shown clearly in the drawings.

I claim—

1. In a vertical-hook coupler, a draw-head having a vertical axis or hook-fulcrum and a hook-supporting surface, as a shelf or ledge, $s$, independent of said axis, combined with a hook or knuckle having an enlarged socket or bearing fitting said axis loosely, whereby the hook is adapted to play laterally on its axis, and provided with a bearing-surface, as $s'$, arranged to co-operate with the surface $s$ of the draw-head, whereby the hook is adapted to come to a bearing on the draw-head without subjecting said axis to injurious stress or strain, as set forth.

2. In a vertical-hook coupler, a draw-head having a vertical axial pin, $e$, and a hook-supporting surface, as $s'$, independent of said pin, combined with a hook or knuckle formed to bear against said supporting-surface, and having an enlarged orifice, $d$, receiving said pin, and a bearing-surface, as $s$, the arrangement being such that all stress or strain exerted on the hook by an opposing coupler is supported by the said surfaces of the draw-head and hook, and the pin is relieved from such stress or strain, as set forth.

3. In a car-coupling, the combination, with the draw-head, the hook, and the loose pivotal connection between the draw-head and hook, of shoulders or abutments on the hook and corresponding shoulders or abutments on the draw-head, against which those on the hook take their bearings to prevent further rotation of and take up thrust on the hook and protect the pivot, substantially as described.

4. In a car-coupler, and in combination with a draw-head of the Dowling type, provided with a buffing-shoulder on the top and bottom plates of said draw-head, the buffing-surface of which is at substantially right angles to the axis of the coupler, a movable knuckle movable in said head and provided with a buffing-surface, also substantially at right angles to the axis of the coupler, and corresponding, when the knuckle is closed, with the buffing-surface of the draw-head, whereby the blow received by the knuckle in coupling is transmitted in a plane substantially parallel to the axis of the coupler.

In testimony whereof I have signed my name to this specification, in the presence of two subscribing witnesses, this 23d day of March, A. D. 1888.

O. E. MICHAELIS.

Witnesses:
KATE WOODBRIDGE MICHAELIS,
GEORGE VAIL SHEPARD MICHAELIS.